(12) United States Patent
Gizinski et al.

(10) Patent No.: US 12,077,143 B2
(45) Date of Patent: Sep. 3, 2024

(54) SYSTEMS AND METHODS FOR REAL TIME PERMANENT MAGNET SYNCHRONOUS MACHINE CONTROL

(71) Applicant: STEERING SOLUTIONS IP HOLDING CORPORATION, Saginaw, MI (US)

(72) Inventors: Nicholas Gizinski, Farmington Hills, MI (US); Thomas J. Stutts, Linwood, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 168 days.

(21) Appl. No.: 17/942,028

(22) Filed: Sep. 9, 2022

(65) Prior Publication Data
US 2023/0080806 A1 Mar. 16, 2023

Related U.S. Application Data

(60) Provisional application No. 63/242,711, filed on Sep. 10, 2021.

(51) Int. Cl.
| | |
|---|---|
| *B60W 10/08* | (2006.01) |
| *B60L 15/20* | (2006.01) |
| *B60W 10/20* | (2006.01) |
| *B62D 5/04* | (2006.01) |
| *H02P 25/022* | (2016.01) |

(52) U.S. Cl.
CPC ............. *B60W 10/08* (2013.01); *B60L 15/20* (2013.01); *B60W 10/20* (2013.01); *B62D 5/0463* (2013.01); *H02P 25/022* (2013.01); *B60L 2220/14* (2013.01); *B60L 2240/423* (2013.01); *B60L 2240/429* (2013.01); *H02P 2207/05* (2013.01)

(58) Field of Classification Search
CPC ....... B60W 10/08; B60W 10/20; H02P 21/50; H02P 25/022; H02P 21/22; H02P 2207/05; B60L 15/20; B60L 15/025; B60L 2240/423; B60L 2240/429; B60L 2220/14; B62D 5/0463
See application file for complete search history.

(56) References Cited

U.S. PATENT DOCUMENTS

| | | | |
|---|---|---|---|
| 2011/0025238 A1* | 2/2011 | Ueda | H02P 21/06 318/400.02 |
| 2017/0250628 A1* | 8/2017 | Tian | H02P 21/14 |
| 2023/0060458 A1* | 3/2023 | Li | H02P 6/08 |

* cited by examiner

*Primary Examiner* — Said Bouziane
(74) *Attorney, Agent, or Firm* — Dickinson Wright PLLC

(57) ABSTRACT

A method includes calculating, for a motor, a voltage constraint and calculating, for the motor, a supply current constraint and a regenerative current constraint. The method also includes calculating, for the motor, a motor current constraint and determining, for the motor, a first operating torque based on the voltage constraint, the supply current constraint, and the motor current constraint. The method also includes at least one of selectively controlling the motor based on the first operating torque and generating information associated with the first operating torque.

20 Claims, 8 Drawing Sheets

SYSTEMS AND METHODS FOR REAL TIME PERMANENT MAGNET SYNCHRONOUS MACHINE CONTROL

CROSS-REFERENCES TO RELATED APPLICATIONS

This patent application claims priority to U.S. Provisional Patent Application Ser. No. 63/242,711, filed Sep. 10, 2021 which is incorporated herein by reference in its entirety.

TECHNICAL FIELD

This disclosure related to permanent magnet synchronous machines and, in particular, to systems and methods for real time permanent magnet synchronous machine control.

BACKGROUND

Vehicles, such as cars, trucks, sport utility vehicles, crossovers, mini-vans, marine craft, aircraft, all-terrain vehicles, recreational vehicles, or other suitable vehicles, are increasingly including driver assistance features, such as advanced driver-assistance systems (ADAS), driver assistance systems (DAS), and the like. Such systems may include adaptive cruise control features, lane keep features, autonomous or semi-autonomous steering features, automatic breaking features, and the like.

Typically, vehicles having ADAS and DAS systems include system architectures that may utilize complex local path planning algorithms. Such algorithms may consider or account for various vehicle dynamics and various vehicle kinematic models to determine an optimal path for the vehicle.

SUMMARY

This disclosure relates generally to permanent magnet synchronous machines.

An aspect of the disclosed embodiments includes a method for motor control. The method includes calculating, for a motor, a voltage constraint and calculating, for the motor, a supply current constraint. The method also includes calculating, for the motor, a motor current constraint and determining, for the motor, a first operating torque based on the voltage constraint, the supply current constraint, and the motor current constraint. The method also includes at least one of selectively controlling the motor based on the first operating torque and generating information associated with the first operating torque.

Another aspect of the disclosed embodiments includes a system for motor control. The system includes a processor and a memory. The memory includes instructions that, when executed by the processor, cause the processor to: calculate, for a motor, a voltage constraint; calculate, for the motor, a supply current constraint; calculate, for the motor, a motor current constraint; determine, for the motor, a first operating torque based on the voltage constraint, the supply current constraint, and the motor current constraint; and at least one of selectively control the motor based on the first operating torque and generate information associated with the first operating torque.

Another aspect of the disclosed embodiments includes a method for determining motor capability. The method includes determining, for a motor, a voltage constraint based on a d-axis voltage component associated with the motor and a q-axis voltage component associated with the motor. The method also includes determining, for the motor, a supply current constraint and a regenerative current constraint based on the d-axis voltage component associated with the motor, the q-axis voltage component associated with the motor, a d-axis current component associated with the d-axis voltage component associated with the motor, a q-axis current component associated with the q-axis voltage component associated with the motor, a supply voltage associated with motor, a supply current associated with the supply voltage associated with the motor, and an electrical resistance associated with the motor. The method also includes determining, for the motor, a motor current constraint based on the d-axis current component associated with the d-axis voltage component associated with the motor, the q-axis current component associated with the q-axis voltage component associated with the motor, and a motor current associated with the motor. The method also includes determining, for the motor, a first operating torque based on the voltage constraint, the supply current constraint, the regenerative current constraint, and the motor current constraint. The method also includes at least one of selectively controlling the motor based on the first operating torque and generating information associated with the first operating torque.

Another aspect of the disclosed embodiments includes a system for determining motor capability. The system includes a processor and a memory. The memory includes instructions that, when executed by the processor, cause the processor to: determine, for a motor, a voltage constraint based on a d-axis voltage component associated with the motor and a q-axis voltage component associated with the motor; determine, for the motor, a supply current constraint and a regenerative current constraint based on the d-axis voltage component associated with the motor, the q-axis voltage component associated with the motor, a d-axis current component associated with the d-axis voltage component associated with the motor, a q-axis current component associated with the q-axis voltage component associated with the motor, a supply voltage associated with motor, a supply current associated with the supply voltage associated with the motor, and an electrical resistance associated with the motor; determine, for the motor, a motor current constraint based on the d-axis current component associated with the d-axis voltage component associated with the motor, the q-axis current component associated with the q-axis voltage component associated with the motor, and a motor current associated with the motor; determine, for the motor, a first operating torque based on the voltage constraint, the supply current constraint, the regenerative current constraint, and the motor current constraint; and at least one of selectively control the motor based on the first operating torque and generate information associated with the first operating torque Another aspect of the disclosed embodiments includes an apparatus for determining motor capability. The apparatus includes a processor and a memory. The memory includes instructions that, when executed by the processor, cause the processor to: determine one or more motor constraints based on at least one of a d-axis voltage component associated with a motor, a q-axis voltage component associated with the motor, a d-axis current component associated with the d-axis voltage component associated with the motor, a q-axis current component associated with the q-axis voltage component associated with the motor, a supply voltage associated with motor, a supply current associated with the supply voltage associated with the motor, an electrical resistance associated with the motor, and a motor current associated with the motor; determine a first operating torque based on the one or more motor constraints; and at least one of selectively control the motor based on the first operating torque and generate information associated with the first operating torque.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
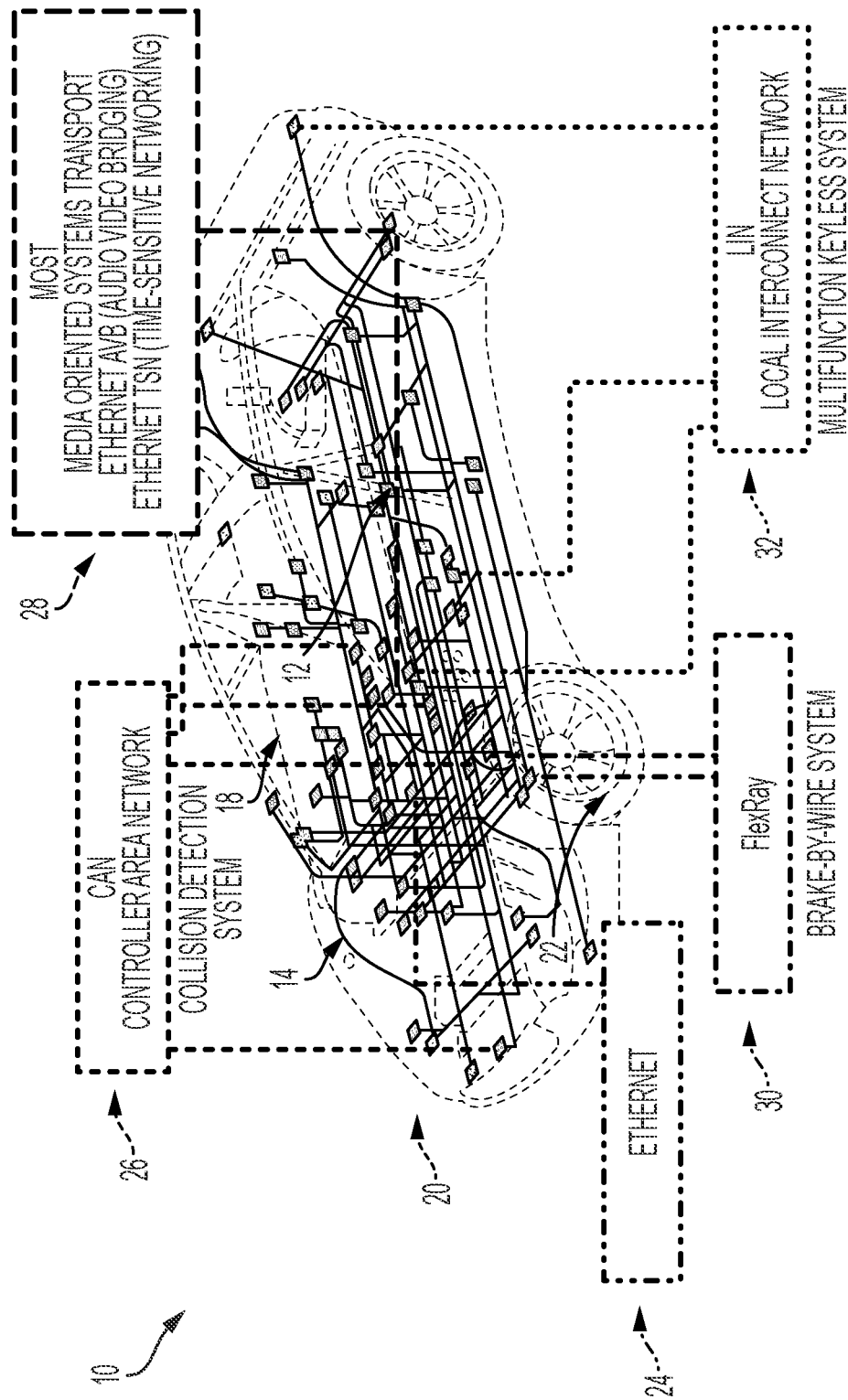
FIG. 1 generally illustrates a vehicle according to the principles of the present disclosure.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, vehicles, such as cars, trucks, sport utility vehicles, crossovers, mini-vans, marine craft, aircraft, all-terrain vehicles, recreational vehicles, or other suitable vehicles, are increasingly including driver assistance features, such as advanced driver-assistance systems (ADAS), driver assistance systems (DAS), and the like. Such systems may include adaptive cruise control features, lane keep features, autonomous or semi-autonomous steering features, automatic breaking features, and the like.

Typically, vehicles having ADAS and DAS systems include system architectures that may utilize complex local path planning algorithms. Such algorithms may consider or account for various vehicle dynamics and various vehicle kinematic models to determine an optimal path for the vehicle.

Additionally, or alternatively, the vehicle may include a steering system, such as an electronic power steering system (EPS), a steer-by-wire (SbW) steering system, and the like. Typically, EPS systems and SbW systems may execute commands necessary to achieve a desired maneuver and/or path. To generate and/or execute such commands, the constraints and/or real time mechanical capability of one or more components of the steering system, such as a motor associated with the steering system or other suitable component, may be accounted for or considered for optimal maneuver and/or path planning.

Typically, a controller associated with the steering system may provide, using the steering system, a maximum achievable handwheel angle, velocity, and torque. For example, the controller may provide the maximum motor torque achievable and the maximum corresponding motor velocity. Increasingly, such steering systems include an equation-based power limit strategy. However, such strategies may not account for various motor or other component constraints.

Accordingly, systems and methods, such as those described herein, configured to provide an achievable real time capability motor torque achievable and a corresponding maximum motor velocity given the equation-based strategies utilized by steering systems that include EPS systems or SbW systems, may be desirable. In some embodiments, the systems and methods described herein may be configured to utilize a suitable number of constraints (e.g., such as one constraint, two constraints, three constraints, four constraints, or other suitable number of constraints) to compute a maximum achievable torque based on operating conditions, such as motor velocity, permanent magnet synchronous machine (PMSM) motor parameters, and/or other suitable operating conditions.

In some embodiments, the constraints may include inverter bridge voltage (e.g., which may be referred to as a bridge voltage constraint), supply current limits, motor current limits, regenerative supply current limits, other suitable constraints, or a combination thereof. In some embodiments, the constraints may be defined according to:

$$\text{Voltage Constraint:} V_q^2 + V_d^2 \leq V_{DC}^2$$

$$\text{Supply/Regenerative Current Constraint:} \frac{\sqrt{3}}{2}(V_d I_d + V_q I_q) \leq V_{DC} I_s - R_{DC} I_s^2$$

$$\text{Motor Current Constraint:} I_d^2 + I_q^2 \leq I_m^2$$

Where $V_d$ represents a d-axis component of an armature voltage for each phase of the motor, $I_d$ represents the d-axis component of a corresponding current of the armature voltage for each phase of the motor, $V_q$ represents a q-axis component of the armature voltage for each phase of the motor, $I_q$ represents the q-axis component of a corresponding current of the armature voltage for each phase of the motor, $I_m$ represents a motor current of the motor, and R represents the armature resistance for each phase of the motor. Additionally, $V_{DC}$ represents the source voltage of the motor (e.g., such as a direct current voltage measurement of the motor), and $R_{DC}$ is a resistance of the electronic circuit between the source voltage and the inverter.

Figure 3A:
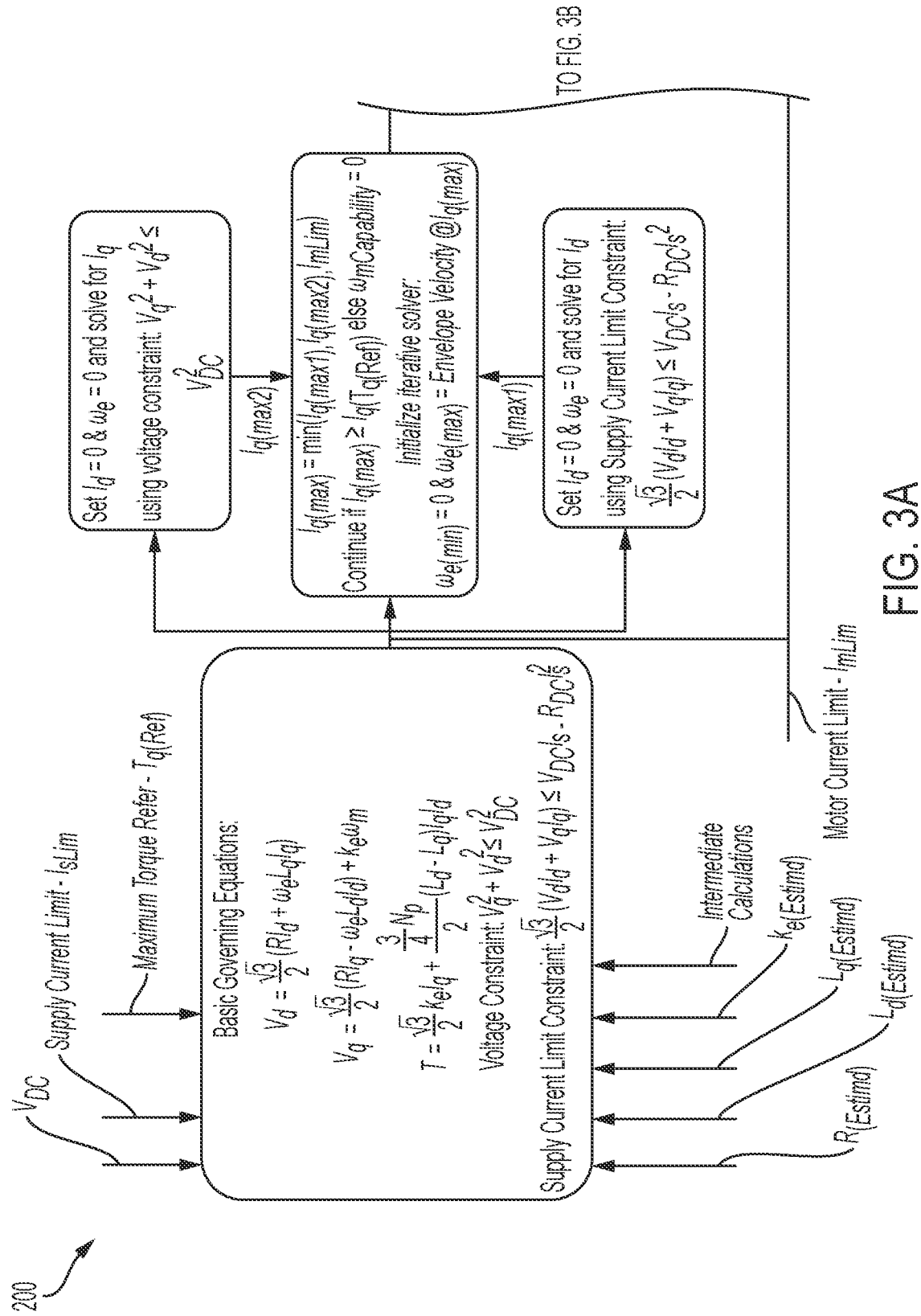
FIGS. 3A-3B generally illustrates a real time permanent magnet synchronous machine control method according to the principles of the present disclosure.

In some embodiments, and as is generally illustrated in FIG. 3A, the systems and methods described herein may be configured to utilize an iterative solver 200 to identify the maximum real time capability mechanical velocity of a motor, such as a PMSM or other suitable machine or motor.

The systems and methods described herein may be configured to calculate maximum motor torque achievable at stall conditions for arbitration with a motor torque reference. In some embodiments, the iterative solver 200 may specify an initialization of a start point and an end point of the iterative solver 200. It should be understood that the systems and methods described herein may be capably of using any suitable start point and end point of the interactive solver 200. The systems and methods described herein may be configured to identify an approximated optimal solution, using the iterative solver 200 or any suitable iterative solver, for motor velocity at the capability of the motor for a specified motor torque. It should be understood that the systems and methods described herein may be utilized for all four motor quadrants.

Figure 3B:
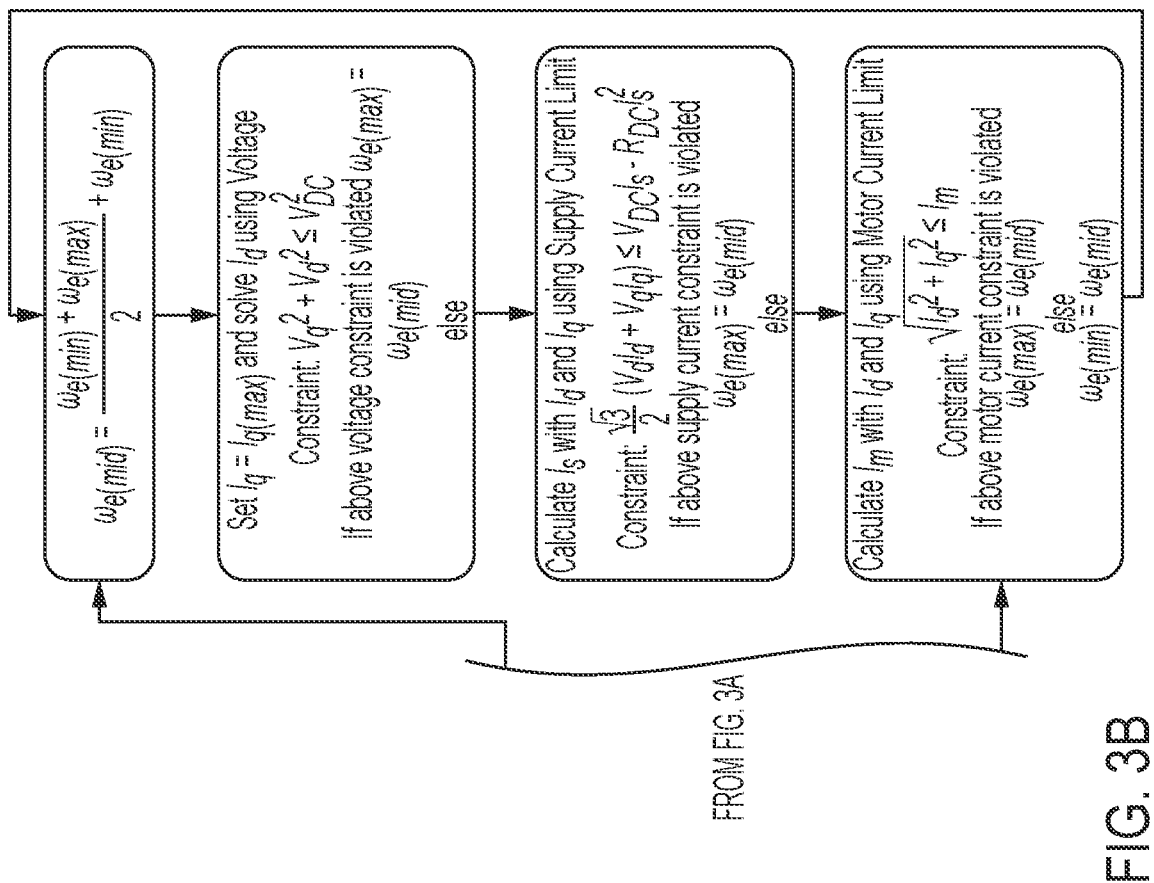
Figure 3C:
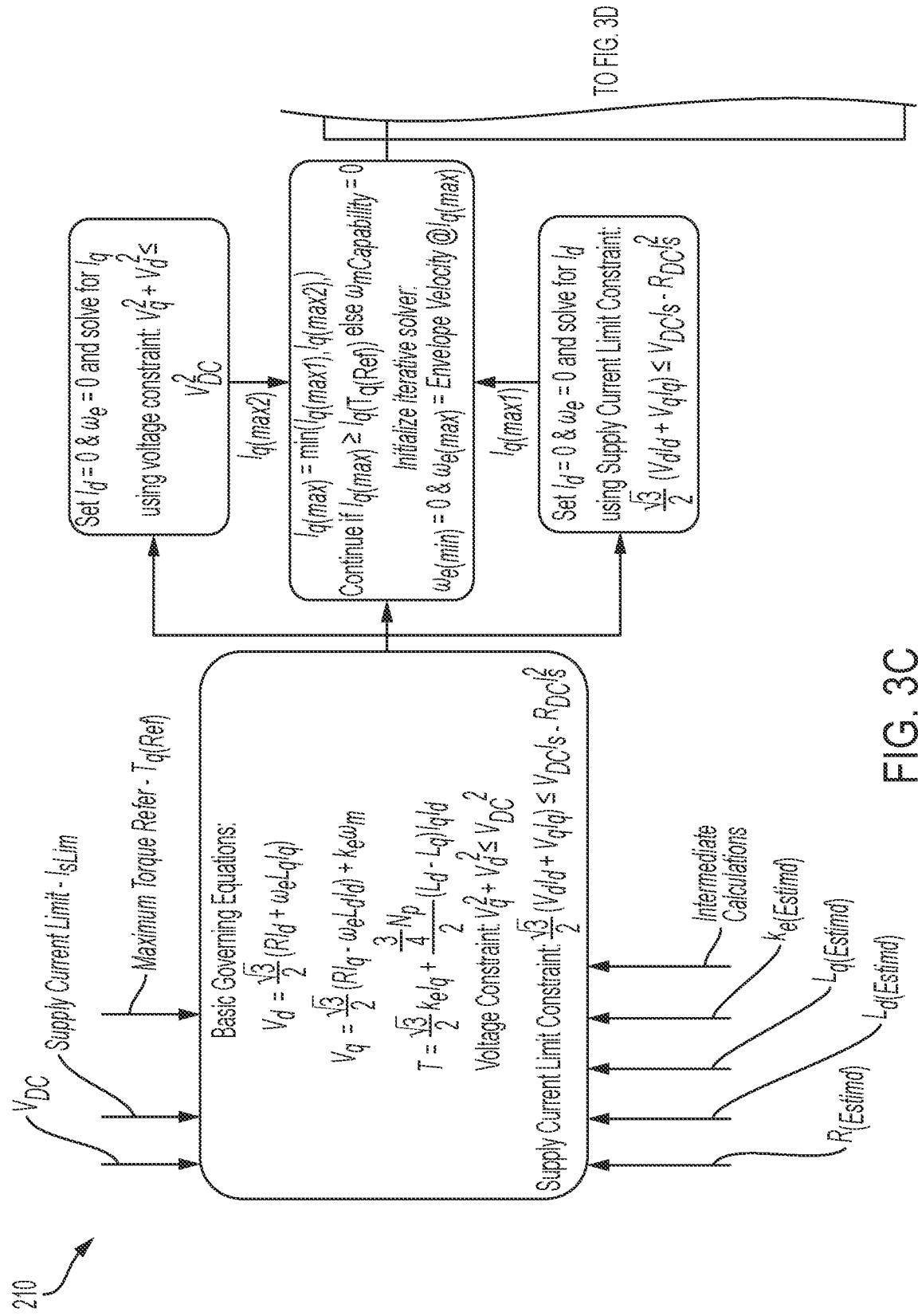
FIGS. 3C-3D generally illustrates an alternatively real time permanent magnet synchronous machine control method according to the principles of the present disclosure.
Figure 3D:
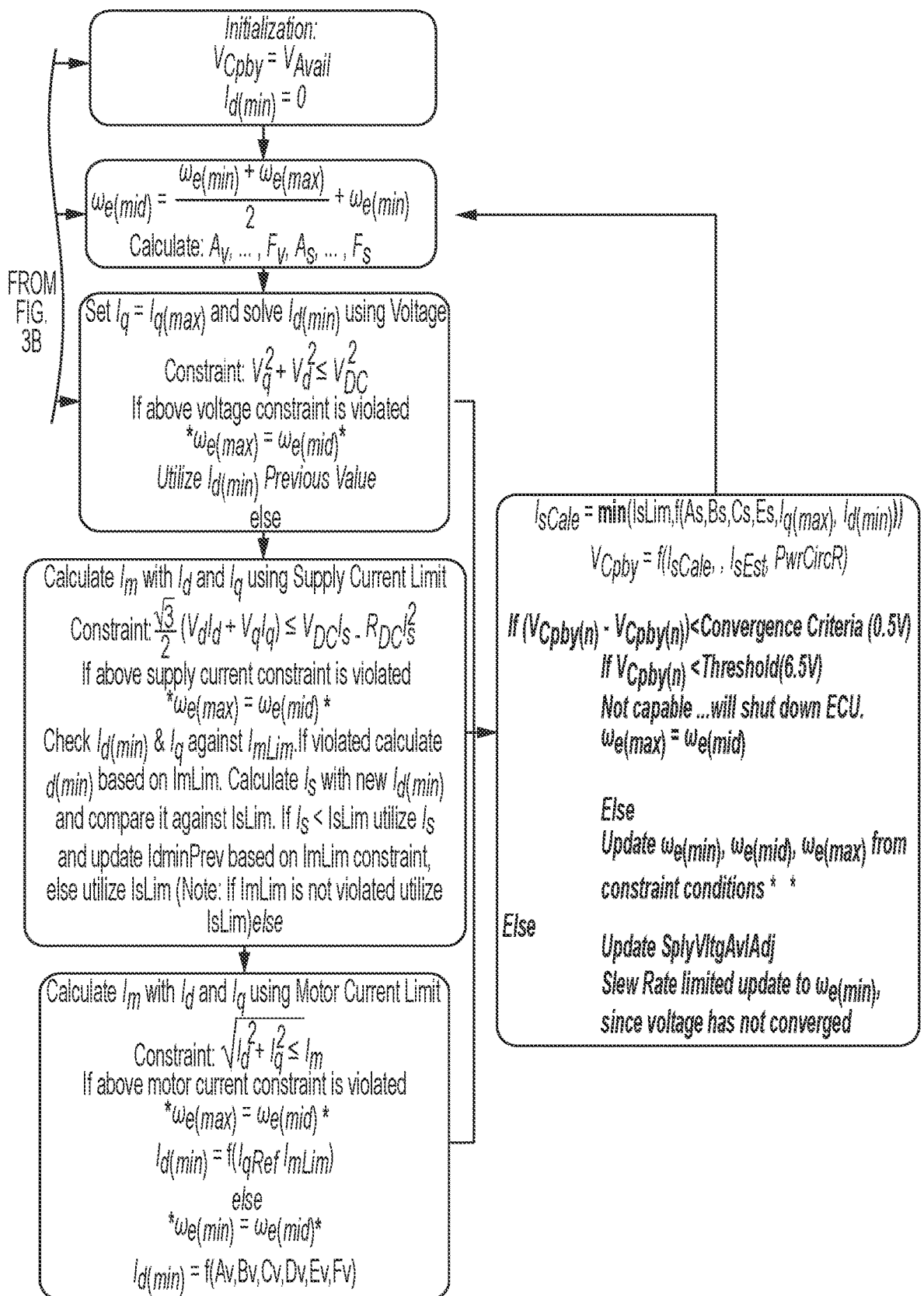

In some embodiments, and as is generally illustrated in FIG. 3B, the systems and methods described herein may be configured to utilize an iterative solver 210 to identify the maximum real time capability mechanical velocity of the motor. The systems and methods described herein may be configured to allow for prediction and/or compensation of a voltage drop across a wiring harness to improve accuracy of the capability signal. The systems and methods described herein may be configured to provide an interface to allow input from one or more sources, which may be used to predict harness resistance.

In some embodiments, the systems and methods described herein may be configured to, when predicting the velocity capability of the electric machine, account variance at the inverter for the available voltage, based on the amount of current being drawn due to voltage drop across the harness. The available voltage may be a function of the supply voltage and/or any direct current (DC) resistance in the circuit prior to the inverter. For the available voltage, the predicted inverter voltage, when operating at a predicted capability may be defined according to:

$$V_{Cpby} = V_{DC} - I_g * \text{PwrCircR}$$

where power circuit resistance (PwrCircR) includes a resistance between the source voltage ($V_{DC}$) and the inverter and $V_{Cpby}$ corresponds to an available voltage at the inverter when operating at the predicted maximum capacity. Predicating and/or compensating for the voltage drop is challenging as there is dependency on the available voltage, supply current, and capability. Accordingly, the systems and methods described herein may be configured to use the iterative solver 210 to adjust the available bridge voltage at each iteration. The systems and methods described herein may be configured to use the available voltage as a component of the convergence criteria. The systems and methods described herein may be configured to provide protection from sqrt (x<0) when computing $I_{sCalc}$ (e.g., because $I_{d\_prev}$ may be used).

The systems and methods described herein may be configured to range limit $V_{Cpby}$, such that $V_{Cpby}$ does not fall below a calibratable value (e.g., such as 4 volts or other suitable value), to avoid relatively high supply currents, which may result in slower convergence and/or less accurate result. The systems and methods described herein may be configured to slew limit $V_{Cpby}$ and $\omega_{e(mtn)}$ through calibration. The systems and methods described herein may be configured to disable voltage adjustment functionality (e.g., and use measured voltage). The systems and methods described herein may be configured to initialize adjusted voltage to a more accurate value by computing the minimum power (e.g., requested torque times a midpoint speed).

Figure 4:
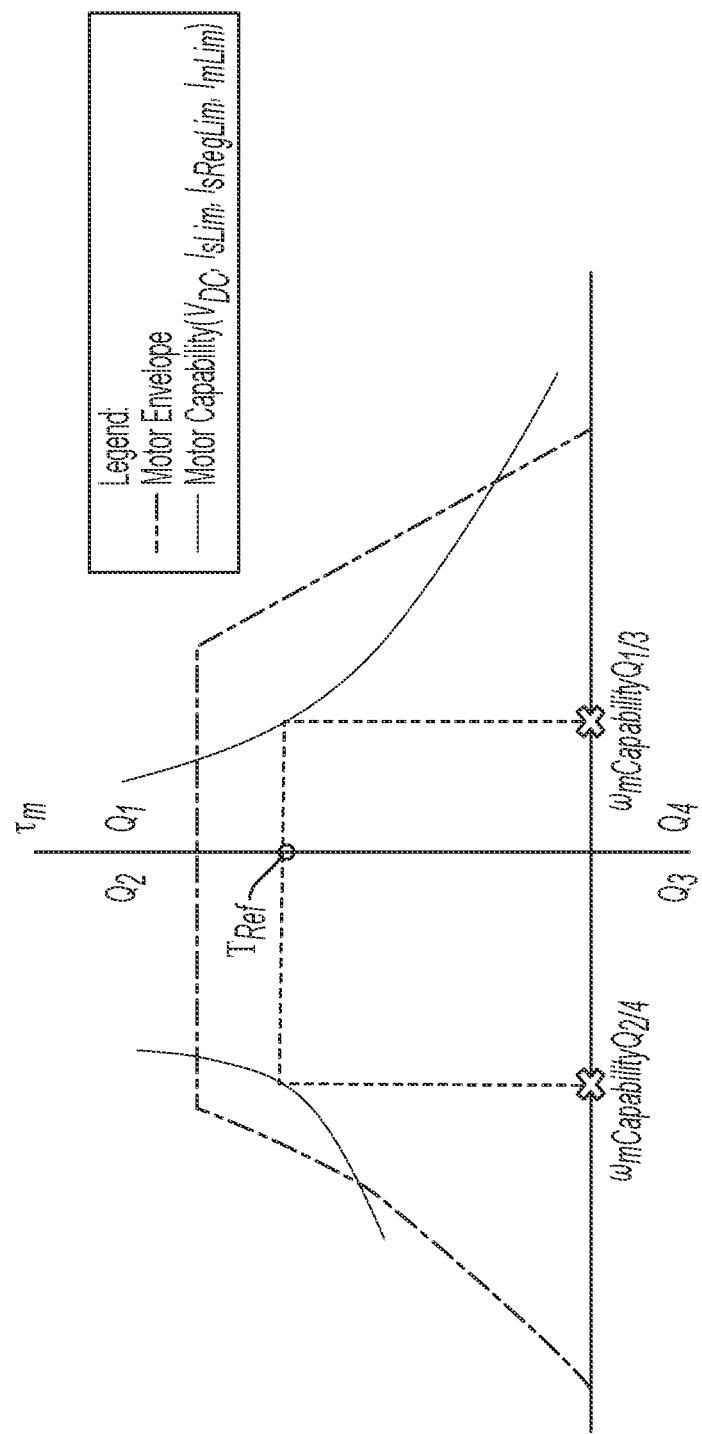
FIG. 4 generally illustrates a chart of a real time permanent magnet synchronous machine control method according to the principles of the present disclosure.

The systems and methods described herein may be configured to iteratively solve for an approximated optimal solution for maximum motor velocity capability taking into consideration the various constraints. FIG. 4 generally illustrates a diagram charting the relationship between motor envelope values and motor capability values.

In some embodiments, the systems and methods described herein may be configured to determine a maximum operating velocity achievable within capability of motor and a supply and/or motor current constraints. In some embodiments, the systems and methods described herein may be configured to calculate, for a motor, a voltage constraint. In some embodiments, the motor includes a permanent magnet synchronous machine or other suitable machine or motor. In some embodiments, the motor is associated with a steering system of a vehicle, such as an EPS system, a SbW system, or the like. The vehicle may include an autonomous or semi-autonomous vehicle. The vehicle may include an ADAS system, a DAS system, or the like.

The systems and methods described herein may be configured to calculate, for the motor, a supply current constraint. The systems and methods described herein may be configured to calculate, for the motor, a motor current constraint. The systems and methods described herein may be configured to determine, for the motor, a first operating torque based on the voltage constraint, the supply current constraint, and the motor current constraint. In some embodiments, the first operating torque corresponds to an upper bound of an operating torque range associated with the motor. For example, the first operating torque may correspond to a maximum operating torque or other suitable torque.

The systems and methods described herein may be configured to at least one of selectively control the motor based on the first operating torque and generate information associated with the first operating torque. In some embodiments, selectively controlling the motor based on the first operating torque includes selecting controlling the motor based on the first operating torque without stalling the motor. In some embodiments, the systems and methods described herein may be configured to plan a path for a vehicle associated with the motor based on, at least, the first operating torque. In some embodiments, selectively controlling the motor based on the first operating torque includes selecting controlling the motor based on the first operating torque without stalling the motor. In some embodiments, generating information associated with the first operating torque may include generating on or more signals indicating a value associated with the first operating torque (e.g., including the maximum operating torque or velocity associated with the motor) and communicating the one or more signals to one or more controllers, computing devices, processors, and the like (e.g., associated with the vehicle or remotely located from the vehicle).

In some embodiments, the systems and methods described herein may be configured to determine, for the motor, a voltage constraint based on a d-axis voltage component associated with the motor and a q-axis voltage component associated with the motor. The systems and methods described herein may be configured to determine, for the motor, a supply current constraint and a regenerative current constraint based on the d-axis voltage component associated with the motor, the q-axis voltage component associated with the motor, a d-axis current component associated with the d-axis voltage component associated with the motor, a q-axis current component associated with the q-axis voltage component associated with the motor, a supply voltage associated with motor, a supply current associated with the supply voltage associated with the motor, and an electrical resistance associated with the motor. The systems and methods described herein may be configured to determine, for the motor, a motor current constraint based on the d-axis current component associated with the d-axis voltage component associated with the motor, the q-axis current component associated with the q-axis voltage component associated with the motor, and a motor current associated with the motor. The systems and methods described herein may be configured to determine, for the motor, a first operating torque based on the voltage constraint, the supply current constraint, the regenerative current constraint, and the motor current constraint. The systems and methods described herein may be configured to at least one of selectively control the motor based on the first operating torque and generate information associated with the first operating torque.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system, a steering-by-wire steering system (e.g., which may include or communicate with one or more controllers that control components of the steering system without the use of mechanical connection between the handwheel and wheels 22 of the vehicle 10), or other suitable steering system. The steering system may include an open-loop feedback control system or mechanism, a closed-loop feedback control system or mechanism, or combination thereof. The steering system may be configured to receive various inputs, including, but not limited to, a handwheel position, an input torque, one or more roadwheel positions, other suitable inputs or information, or a combination thereof. Additionally, or alternatively, the inputs may include a handwheel torque, a handwheel angle, a motor velocity, a vehicle speed, an estimated motor torque command, other suitable input, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10.

Figure 2:
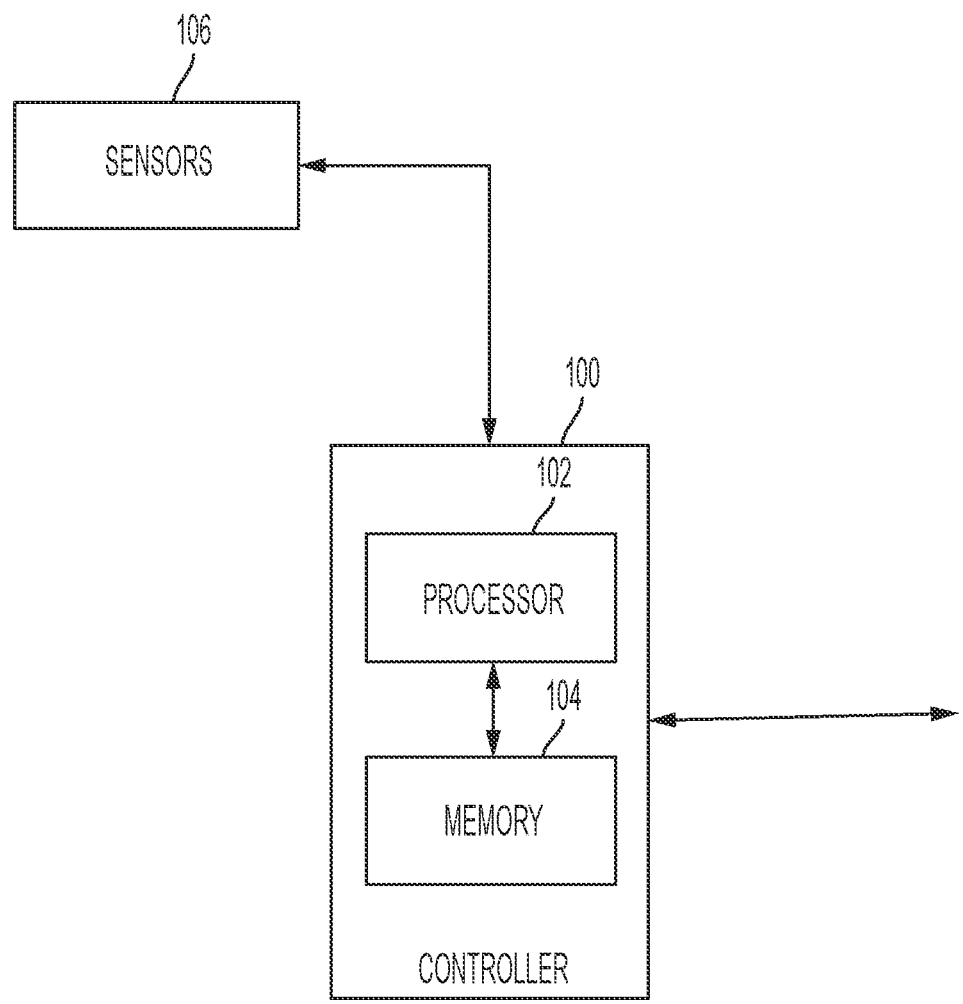
FIG. 2 generally illustrates a control system including a controller according to the principles of the present disclosure.

In some embodiments, the vehicle 10 may include a controller, such as controller 100, as is generally illustrated in FIG. 2. The controller 100 may include any suitable controller, such as an electronic control unit or other suitable controller. The controller 100 may be configured to control, for example, the various functions of the steering system and/or various functions of the vehicle 10. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various aspects of the vehicle 10.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more torque sensors or devices, one or more handwheel position sensors or devices, one or more motor position sensor or devices, one or more position sensors or devices, other suitable sensors or devices, or a combination thereof. The one or more signals may indicate a handwheel torque, a handwheel angel, a motor velocity, a vehicle speed, other suitable information, or a combination thereof.

In some embodiments, controller 100 may determine a maximum operating velocity achievable within capability of motor and a supply and/or motor current constraints. For example, the controller 100 may calculate, for the motor, a voltage constraint. As described, the motor may include a PMSM, or other suitable machine or motor, and may be associated with the steering system of the vehicle 10

The controller 100 may calculate, for the motor, a supply current constraint. The controller 100 may calculate, for the motor, a motor current constraint. It should be understood that the controller 100 may calculate any suitable constraint or set of constraints associated with the motor. The controller 100 may determine, for the motor, a first operating torque based on the voltage constraint, the supply current constraint, and the motor current constraint. The first operating torque may correspond to an upper bound of an operating torque range associated with the motor. For example, the first operating torque may correspond to a maximum operating torque or other suitable torque.

The controller 100 may selectively control the motor based on the first operating torque and/or generate information associated with the first operating torque, as described. For example, the controller 100 may selectively control the motor based on the first operating torque without stalling the motor. In some embodiments, the systems and methods described herein may be configured to plan a path for a vehicle associated with the motor based on, at least, the first operating torque. In some embodiments, selectively controlling the motor based on the first operating torque includes selecting controlling the motor based on the first operating torque without stalling the motor.

In some embodiments, the controller 100 may determine, for the motor, a voltage constraint based on a d-axis voltage component associated with the motor and a q-axis voltage component associated with the motor. The controller 100 may determine, for the motor, a supply current constraint and a regenerative current constraint based on the d-axis voltage component associated with the motor, the q-axis voltage component associated with the motor, a d-axis current component associated with the d-axis voltage component associated with the motor, a q-axis current component associated with the q-axis voltage component associated with the motor, a supply voltage associated with motor, a supply current associated with the supply voltage associated with the motor, and an electrical resistance associated with the motor. The controller 100 may determine, for the motor, a motor current constraint based on the d-axis current component associated with the d-axis voltage component associated with the motor, the q-axis current component associated with the q-axis voltage component associated with the motor, and a motor current associated with the motor. The controller 100 may determine, for the motor, a first operating torque based on the voltage constraint, the supply current constraint, the regenerative current constraint, and the motor current constraint. The controller 100 may selectively control the motor based on the first operating torque and/or generate and/or provide information associated with the first operating torque.

In some embodiments, the controller 100 may perform the methods described herein. However, the methods described herein as performed by the controller 100 are not meant to be limiting, and any type of software executed on a controller or processor can perform the methods described herein without departing from the scope of this disclosure. For example, a controller, such as a processor executing software within a computing device, can perform the methods described herein.

Figure 5:
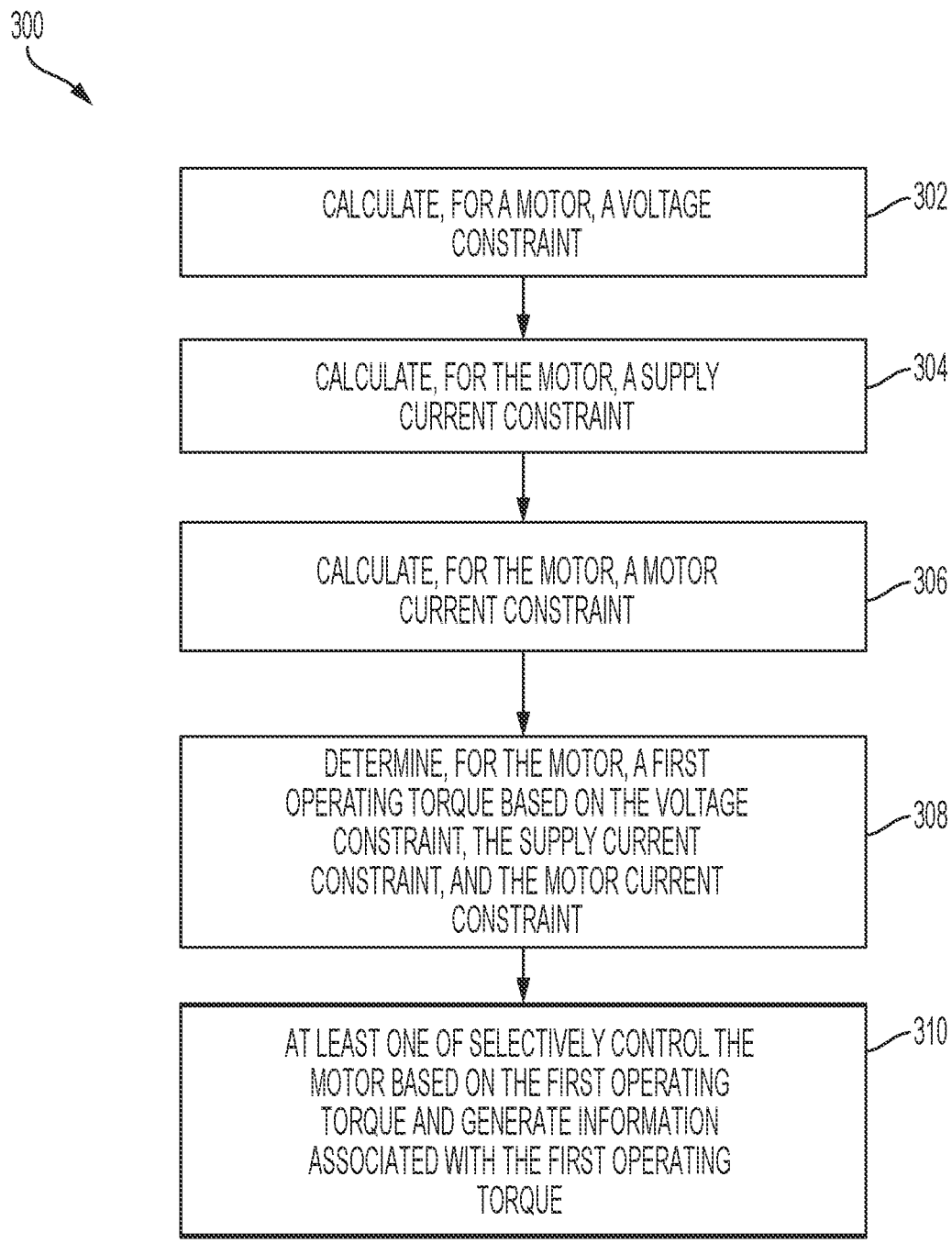
FIG. 5 is a flow diagram generally illustrating an alternative real time permanent magnet synchronous machine control method according to the principles of the present disclosure.

FIG. 5 is a flow diagram generally illustrating a real time permanent magnet synchronous machine control method 300 according to the principles of the present disclosure. At 302, the method 300 calculates, for a motor, a voltage constraint. For example, the controller 100 may calculate, for the motor, the voltage constraint, as described herein.

At 304, the method 300 calculates, for the motor, a supply current constraint. For example, the controller 100 may calculate, for the motor, the supply current constraint, as described herein. Additionally, or alternatively, the controller 100 may calculate a regenerative current constraint, as described.

At 306, the method 300 calculates, for the motor, a motor current constraint. For example, the controller 100 may calculate, for the motor, the motor current constraint, as described.

At 308, the method 300 determines, for the motor, a first operating torque based on the voltage constraint, the supply current constraint, and the motor current constraint. For example, the controller 100 may determine, for the motor, the first operating torque based on the voltage constraint, the supply current constraint, and the motor current constraint. Additionally, or alternatively, the controller 100 may further determine the first operating torque based on the regenerative current constraint.

At 310, the method 300 at least one of selectively controls the motor based on the first operating torque and generates information associated with the first operating torque. For example, the controller 100 may selectively control the motor based on the first operating torque and/or generate the information associated with the first operating torque.

In some embodiments, a method for motor control includes calculating, for a motor, a voltage constraint and calculating, for the motor, a supply current constraint. The method also includes calculating, for the motor, a motor current constraint and determining, for the motor, a first operating torque based on the voltage constraint, the supply current constraint, and the motor current constraint. The method also includes at least one of selectively controlling the motor based on the first operating torque and generating information associated with the first operating torque.

In some embodiments, the motor includes a permanent magnet synchronous machine. In some embodiments, the motor is associated with a steering system of a vehicle. In some embodiments, the steering system includes an electronic power steering system. In some embodiments, the steering system includes a steer-by-wire steering system. In some embodiments, the motor is associated with an advanced driver-assistance system. In some embodiments, the motor is associated with an autonomous vehicle. In some embodiments, the method also includes planning a path for a vehicle associated with the motor based on, at least, the first operating torque. In some embodiments, the first operating torque corresponds to an upper bound of an operating torque range associated with the motor. In some embodiments, selectively controlling the motor based on the first operating torque includes selecting controlling the motor based on the first operating torque without stalling the motor.

In some embodiments, a system for motor control includes a processor and a memory. The memory includes instructions that, when executed by the processor, cause the processor to: calculate, for a motor, a voltage constraint; calculate, for the motor, a supply current constraint; calculate, for the motor, a motor current constraint; determine, for the motor, a first operating torque based on the voltage constraint, the supply current constraint, and the motor current constraint; and at least one of selectively control the motor based on the first operating torque and generate information associated with the first operating torque.

In some embodiments, the motor includes a permanent magnet synchronous machine. In some embodiments, the motor is associated with a steering system of a vehicle. In some embodiments, the steering system includes an electronic power steering system. In some embodiments, the steering system includes a steer-by-wire steering system. In some embodiments, the motor is associated with an advanced driver-assistance system. In some embodiments, the motor is associated with an autonomous vehicle. In some embodiments, the instructions further cause the processor to plan a path for a vehicle associated with the motor based on, at least, the first operating torque. In some embodiments, the first operating torque corresponds to an upper bound of an operating torque range associated with the motor. In some embodiments, the instructions further cause the processor to selecting control the motor based on the first operating torque without stalling the motor.

In some embodiments, a method for determining motor capability includes determining, for a motor, a voltage constraint based on a d-axis voltage component associated with the motor and a q-axis voltage component associated with the motor. The method also includes determining, for the motor, a supply current constraint and a regenerative current constraint based on the d-axis voltage component associated with the motor, the q-axis voltage component associated with the motor, a d-axis current component associated with the d-axis voltage component associated with the motor, a q-axis current component associated with the q-axis voltage component associated with the motor, a supply voltage associated with motor, a supply current associated with the supply voltage associated with the motor, and an electrical resistance associated with the motor. The method also includes determining, for the motor, a motor current constraint based on the d-axis current component associated with the d-axis voltage component associated with the motor, the q-axis current component associated with the q-axis voltage component associated with the motor, and a motor current associated with the motor. The method also includes determining, for the motor, a first operating torque based on the voltage constraint, the supply current constraint, the regenerative current constraint, and the motor current constraint. The method also includes at least one of selectively controlling the motor based on the first operating torque and generating information associated with the first operating torque.

In some embodiments, the motor includes a permanent magnet synchronous machine. In some embodiments, the motor is associated with a steering system of a vehicle. In some embodiments, the steering system includes an electronic power steering system. In some embodiments, the steering system includes a steer-by-wire steering system. In some embodiments, the motor is associated with an advanced driver-assistance system. In some embodiments, the motor is associated with an autonomous vehicle. In some embodiments, the method also includes planning a path for a vehicle associated with the motor based on, at least, the first operating torque. In some embodiments, the first operating torque corresponds to an upper bound of an operating torque range associated with the motor. In some embodiments, selectively controlling the motor based on the first operating torque includes selecting controlling the motor based on the first operating torque without stalling the motor.

In some embodiments, a system for determining motor capability includes a processor and a memory. The memory includes instructions that, when executed by the processor, cause the processor to: determine, for a motor, a voltage constraint based on a d-axis voltage component associated with the motor and a q-axis voltage component associated with the motor; determine, for the motor, a supply current constraint and a regenerative current constraint based on the d-axis voltage component associated with the motor, the q-axis voltage component associated with the motor, a d-axis current component associated with the d-axis voltage component associated with the motor, a q-axis current component associated with the q-axis voltage component associated with the motor, a supply voltage associated with motor, a supply current associated with the supply voltage associated with the motor, and an electrical resistance associated with the motor; determine, for the motor, a motor current constraint based on the d-axis current component associated with the d-axis voltage component associated with the motor, the q-axis current component associated with the q-axis voltage component associated with the motor, and a motor current associated with the motor; determine, for the motor, a first operating torque based on the voltage constraint, the supply current constraint, the regenerative current constraint, and the motor current constraint; and at least one of selectively control the motor based on the first operating torque and generate information associated with the first operating torque.

In some embodiments, the motor includes a permanent magnet synchronous machine. In some embodiments, the motor is associated with a steering system of a vehicle. In some embodiments, the steering system includes an electronic power steering system. In some embodiments, the steering system includes a steer-by-wire steering system. In some embodiments, the motor is associated with an advanced driver-assistance system. In some embodiments, the motor is associated with an autonomous vehicle. In some embodiments, the instructions further cause the processor to plan a path for a vehicle associated with the motor based on, at least, the first operating torque. In some embodiments, the first operating torque corresponds to an upper bound of an operating torque range associated with the motor.

In some embodiments, an apparatus for determining motor capability includes a processor and a memory. The memory includes instructions that, when executed by the processor, cause the processor to: determine one or more motor constraints based on at least one of a d-axis voltage component associated with a motor, a q-axis voltage component associated with the motor, a d-axis current component associated with the d-axis voltage component associated with the motor, a q-axis current component associated with the q-axis voltage component associated with the motor, a supply voltage associated with motor, a supply current associated with the supply voltage associated with the motor, an electrical resistance associated with the motor, and a motor current associated with the motor; determine a first operating torque based on the one or more motor constraints; and at least one of selectively control the motor based on the first operating torque and generate information associated with the first operating torque.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for determining motor capability, the method comprising:
    determining, for a motor, a voltage constraint based on a d-axis voltage component associated with the motor and a q-axis voltage component associated with the motor;
    determining, for the motor, a supply current constraint and a regenerative current constraint based on the d-axis voltage component associated with the motor, the q-axis voltage component associated with the motor, a d-axis current component associated with the d-axis voltage component associated with the motor, a q-axis current component associated with the q-axis voltage component associated with the motor, a supply voltage associated with motor, a supply current associated with the supply voltage associated with the motor, and an electrical resistance associated with the motor;
    determining, for the motor, a motor current constraint based on the d-axis current component associated with the d-axis voltage component associated with the motor, the q-axis current component associated with the q-axis voltage component associated with the motor, and a motor current associated with the motor;
    determining, for the motor, a first operating torque based on the voltage constraint, the supply current constraint, the regenerative current constraint, and the motor current constraint; and
    at least one of selectively controlling the motor based on the first operating torque and generating information associated with the first operating torque.

2. The method of claim 1, wherein the motor includes a permanent magnet synchronous machine.

3. The method of claim 1, wherein the motor is associated with a steering system of a vehicle.

4. The method of claim 3, wherein the steering system includes an electronic power steering system.

5. The method of claim 3, wherein the steering system includes a steer-by-wire steering system.

6. The method of claim 1, wherein the motor is associated with an advanced driver-assistance system.

7. The method of claim 1, wherein the motor is associated with an autonomous vehicle.

8. The method of claim 1, further comprising planning a path for a vehicle associated with the motor based on, at least, the first operating torque.

9. The method of claim 1, wherein the first operating torque corresponds to an upper bound of an operating torque range associated with the motor.

10. The method of claim 1, wherein selectively controlling the motor based on the first operating torque includes selecting controlling the motor based on the first operating torque without stalling the motor.

11. A system for determining motor capability, the system comprising:
a processor; and
a memory including instructions that, when executed by the processor, cause the processor to:
determine, for a motor, a voltage constraint based on a d-axis voltage component associated with the motor and a q-axis voltage component associated with the motor;
determine, for the motor, a supply current constraint and a regenerative current constraint based on the d-axis voltage component associated with the motor, the q-axis voltage component associated with the motor, a d-axis current component associated with the d-axis voltage component associated with the motor, a q-axis current component associated with the q-axis voltage component associated with the motor, a supply voltage associated with motor, a supply current associated with the supply voltage associated with the motor, and an electrical resistance associated with the motor;
determine, for the motor, a motor current constraint based on the d-axis current component associated with the d-axis voltage component associated with the motor, the q-axis current component associated with the q-axis voltage component associated with the motor, and a motor current associated with the motor;
determine, for the motor, a first operating torque based on the voltage constraint, the supply current constraint, the regenerative current constraint, and the motor current constraint; and
at least one of selectively control the motor based on the first operating torque and generate information associated with the first operating torque.

12. The system of claim 11, wherein the motor includes a permanent magnet synchronous machine.

13. The system of claim 11, wherein the motor is associated with a steering system of a vehicle.

14. The system of claim 13, wherein the steering system includes an electronic power steering system.

15. The system of claim 13, wherein the steering system includes a steer-by-wire steering system.

16. The system of claim 11, wherein the motor is associated with an advanced driver-assistance system.

17. The system of claim 11, wherein the motor is associated with an autonomous vehicle.

18. The system of claim 11, wherein the instructions further cause the processor to plan a path for a vehicle associated with the motor based on, at least, the first operating torque.

19. The system of claim 11, wherein the first operating torque corresponds to an upper bound of an operating torque range associated with the motor.

20. An apparatus for determining motor capability, the apparatus comprising:
a processor; and
a memory including instructions that, when executed by the processor, cause the processor to:
determine one or more motor constraints based on at least one of a d-axis voltage component associated with a motor, a q-axis voltage component associated with the motor, a d-axis current component associated with the d-axis voltage component associated with the motor, a q-axis current component associated with the q-axis voltage component associated with the motor, a supply voltage associated with motor, a supply current associated with the supply voltage associated with the motor, an electrical resistance associated with the motor, and a motor current associated with the motor;
determine a first operating torque based on the one or more motor constraints; and
at least one of selectively control the motor based on the first operating torque and generate information associated with the first operating torque.

* * * * *